M. STEPHENS.

Improvement in Joints for Cement-Pipes.

No. 4,980. Reissued July 16, 1872.

Witnesses,

Chas. H. Smith,

Harold Perrell

Inventor,

Melvin Stephens.

L. W. Perrell atty

UNITED STATES PATENT OFFICE.

MELVIN STEPHENS, OF BROOKLYN, NEW YORK, ASSIGNOR TO HIMSELF AND NATHAN STEPHENS, OF SAME PLACE.

IMPROVEMENT IN JOINTS FOR CEMENT PIPES.

Specification forming part of Letters Patent No. 94,146, dated August 24, 1869; reissue, No. 4,980, dated July 16, 1872.

*To all whom it may concern:*

Be it known that I, MELVIN STEPHENS, of Brooklyn, in the county of Kings and State of New York, have invented and made a certain new and useful Improvement in Joints for Cement Pipes; and the following is declared to be a full and exact description of the same.

Cement pipes have heretofore been made in which a sheet-iron tube is lined with cement, and the joints between these pipes have been made by setting the ends of the sections closely together and then pressing cement around the joint, and sometimes a cast-metal ring has been used to surround the cement.

This mode of construction is objectionable, because the cement does not unite the flat surfaces of the cement-lining that come together, and the water sometimes works out between the joint and along the iron surface between that and the cement collar, and in many instances the cement-lining contracts away from the iron casing and the water passes in at the ends of the pipes and escapes at the laps in the iron casing.

My invention obviates the before-mentioned difficulties, makes a very strong and perfect joint, saves cement, facilitates construction, and lessens the expense.

Figure 1:
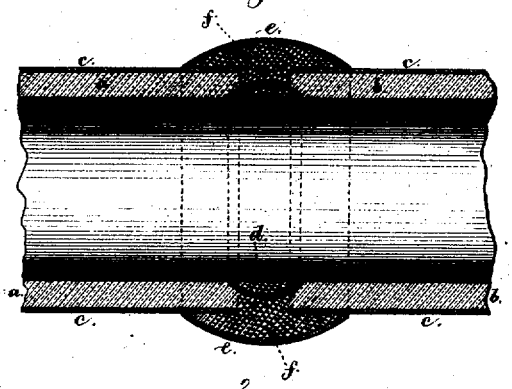
Figure 2:
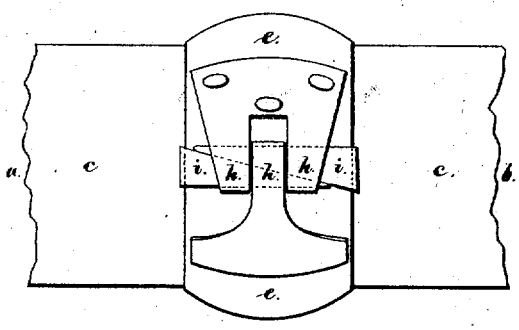
Figure 3:
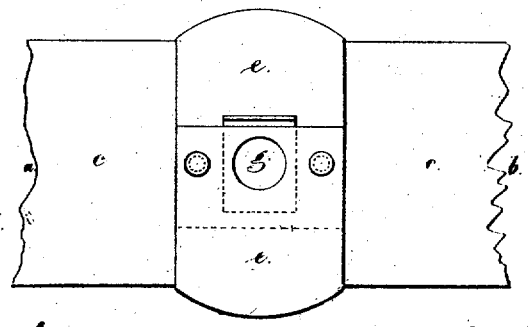
Figure 5:
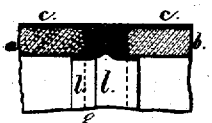
Figure 4:
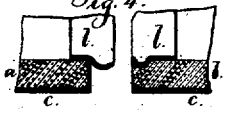

In the drawing, Figure 1 is a section longitudinally of a pipe and joint. Fig. 2 is a plan of the ring and keys for tightening the same. Fig. 3 represents the ring and opening for introducing cement. Fig. 4 is a section of part of a joint; and Fig. 5 represents the joint as partially made.

Similar marks of reference denote the same parts.

*a* and *b* represent portions of cement pipes, formed in any usual manner; *c c* being the sheet-iron casings of said pipes.

Instead of bringing the ends of the pipes as close together as convenient I make use of the ring *d*, that is formed of sheet metal and convex on its outer surface, so that the edges of the ring can slip into the ends of the sections of pipe, but the convexity of the exterior of the ring prevents the parts being pressed together beyond a certain point. This ring *d* may be filled with cement, so that the inner surface of the pipe at the joint may be smooth or nearly so, and this ring facilitates the laying of pipe when one length is not on the same line as the other. The workman fills the space between the pipes with cement.

It is best to moisten the ends of the pipe in the first instance, and the cement is to be pressed into the joint by the workman's hand or by a tool applied to "wipe" the cement around the joint and thereby unite the ends of the cement and prevent leakage.

In order to form an exterior protection to the joint I use a second ring, *e*, made of sheet metal and concave on the inside, in order that the edges of the ring may set closely to the exterior of the pipe and a space be left between the ring and pipe for cement, as at *f*. This ring *e* may be made to fit the exterior of the pipe and be slipped over the joint, as prepared in the manner before described, and then the space *f*, filled by pouring or pressing the cement in through a hole, as seen at *g*, Fig. 3. This fills the interior of the sheet-metal ring *e* tightly around the joint, especially when prepared with the ring *d*, as before described. I, however, prefer to make the metal band that surrounds the cement of the joint so that it can be compressed upon the cement to consolidate the same, because when said cement is not compressed there may be air-holes or cavities rendering the joint liable to leak.

When the compressible ring may be made in the form shown in Fig. 2, the workman wipes around the joint, leaving sufficient cement projecting to fill the space *f*, and then the sections of rings are applied, or the rings sprung open and passed over the cement and drawn or pressed closely around the same to consolidate it and hold the cement tightly upon the joint. The ring *e* being drawn closely to the pipe so that its edges bind upon the exterior surface of the pipe, serves to hold the ends of the cement pipe firmly and prevent the cement being cracked by the jar or concussion resulting from packing earth around the pipe in filling the trench. Beside this the ring *e* being of sheet metal and convex is very strong to resist the pressure of water; and the said ring with its filling of cement forms an arch that resists the weight of the superincumbent earth and prevents the pipe becoming flattened.

*h h* are tongues or loops applied to the ends of the ring *e*, through which the key or keys *i* are inserted to firmly hold the band to its place.

In repairing cement pipes it frequently happens that one pipe cannot be pressed up against the next; hence an internal ring, in the form shown in Fig. 1, could not be employed. I therefore provide a sheet-metal ring, *l*, Fig. 4, of a size to fit the interior of the pipe, and with a bead or flange on one edge, so as to prevent its slipping into the pipe, and I insert the same as in Fig. 4, and introduce the section of pipe or stop-cock into the required place. I then slip the ring *l* out until it reaches the end of the other pipe, or until the flanges or ribs and beads of the two (if two are used) interlock, as in Fig. 5. The flanges or beads facilitate the moving of the ring by a tool introduced at the joint. The joint is rendered water-tight by cement applied around said ring *l* and between the ends of the pipes, or a winding of twine and white lead or other material may be introduced to form the filling of the joint.

By my improvement the cement of the lining is durably united; hence there cannot be any leakage, as has heretofore sometimes been the case, by water passing between the cement at the ends of the pipe, thence between the sheet-iron and the cement, and escaping where the sheet-iron is lapped and riveted. This joint is much stronger than those before made, and the earth, in filling the trench, does not injure the cement around the joint.

I am aware that cement in a semi-liquid state has been poured into a concave ring of cast-iron around a joint, but the space is not always filled and leakage ensues, and sometimes the cement runs into the water-pipe. By using the cement in a plastic state these difficulties are prevented.

Cast-iron couplings have also been cemented to the pipe and then screwed together. These are costly and difficult of application, particularly to large pipe.

By employing a concave ring of wrought-iron all these difficulties are obviated and the joint rendered much more secure than those before made.

What I claim, and desire to secure by Letters Patent, is—

1. A metal ring, applied within cement-pipes between the ends, to be united by cement, substantially as set forth.

2. A sheet-metal ring surrounding the ends of the cement pipes and in contact with the exterior of such pipes, and formed with a recess or cavity for the reception of the cement that forms the joint, substantially as set forth.

3. The open ring *e*, for inclosing the cement around the joint between the ends of the pipe, in combination with mechanism, substantially as set forth, for contracting the ring around the cement and consolidating the same, substantially as set forth.

4. A joint for cement pipes, made by spreading cement upon the adjacent ends of the pipes, pressing such cement in between the ends of the pipes, and then inclosing the cement in a sheet-metal case or ring, to consolidate and support the same, substantially as set forth.

5. A band applied around the joint of cement pipe and contracted around such pipe firmly into contact therewith, so as to support the joint independently of the cement that fills the said band, substantially as specified.

6. A concave ring, made of sheet-iron, surrounding the joint between two lengths of pipe and filled with cement, as and for the purposes set forth.

In witness whereof I have hereunto set my signature this 25th day of March, A. D. 1872.

MELVIN STEPHENS.

Witnesses:

GEO. T. PINCKNEY,
CHAS. H. SMITH.